US006390799B1

(12) United States Patent
Volkl

(10) Patent No.: US 6,390,799 B1
(45) Date of Patent: May 21, 2002

(54) CALIBRATED CUTTING DEVICE

(76) Inventor: Thomas Volkl, Am Wald 16, Bruckmühl (DE), D-83052

(*) Notice: Subject to any disclaimer, the term of this patent is extended or adjusted under 35 U.S.C. 154(b) by 0 days.

(21) Appl. No.: 09/622,282

(22) PCT Filed: Feb. 12, 1999

(86) PCT No.: PCT/EP99/00927

§ 371 Date: Aug. 15, 2000

§ 102(e) Date: Aug. 15, 2000

(87) PCT Pub. No.: WO99/42260

PCT Pub. Date: Aug. 26, 1999

(30) Foreign Application Priority Data

Feb. 17, 1998 (DE) ........................................ 198 06 561

(51) Int. Cl.[7] ............................ A23L 1/00; B26D 7/01; B26D 7/06; B26D 7/30; B26D 7/32

(52) U.S. Cl. .......................... 425/308; 99/353; 99/355; 99/450.1; 99/537; 425/311

(58) Field of Search .......................... 99/537, 538, 543, 99/545, 547; 83/437.4, 559, 437.7, 607, 694, 176, 465, 19; 425/308, 310, 311, 574, 542, 193, 338, 422, 513, 441, 357, 449, 302.1; 426/518, 513; 264/157; 452/149, 174

(56) References Cited

U.S. PATENT DOCUMENTS 2,021,794 A 11/1935 Leone
2,101,755 A 12/1937 Rosenstone et al.
2,500,973 A 3/1950 Ackerman
3,733,652 A 5/1973 House
4,039,691 A * 8/1977 Hildebolt ................ 425/308 X
4,104,958 A * 8/1978 Manser et al. ................ 99/355
4,356,205 A 10/1982 Richards
4,454,804 A * 6/1984 McCullock .................. 99/348
4,731,006 A * 3/1988 Freda et al. ............ 425/308 X
4,966,542 A * 10/1990 Kobayashi .............. 425/308 X
5,030,078 A * 7/1991 Matthews et al. ...... 425/308 X

FOREIGN PATENT DOCUMENTS

DE 25 01 089 7/1976
EP 0 306 012 A2 3/1989
WO 99/08843 8/1998

* cited by examiner

*Primary Examiner*—Timothy F. Simone
(74) *Attorney, Agent, or Firm*—Nixon & Vanderhye

(57) ABSTRACT

The invention relates to a calibrated cutting device for slicing foodstuffs that are suitable for cutting, more particularly meat products. Said device has the following characteristics: a base frame (1) is provided; a shaping tube (55) is also provided, through which the food product that is to be sliced is moved forward in the direction of a calibrated cavity (49); the calibrated shaping cavity (49) is a separate constructive unit different from the shaping tube (49); a knife arrangement (65) moving lengthwise is provided between the feed hole (31) of the calibrated shaping cavity (49) and the adjacent delivery hole (63) of the shaping tube (55), which is arranged between the calibrated cavity (49) and the shaping tube (55); a clamping unit (13) is also provided. The shaping tube (55) and the calibrated shaping cavity (49) can be pressed together by means of the clamping device (13) in order to achieve a negative pressure on the shaping tube (55) through the calibrated shaping cavity (49).

16 Claims, 2 Drawing Sheets

CALIBRATED CUTTING DEVICE

BACKGROUND OF THE INVENTION

In many areas of foodstuffs technology, it is desirable for certain amounts of foodstuffs to be prepared in portions which are as accurate as possible.

While the portioning of liquid or free-flowing materials takes place without problems or substantially without problems, the portioning of foodstuffs which do not flow has to be considered to be something other than optimum.

For example, during the production and further processing of meat products, it would be desirable if, for example, beef, pork or turkey meat could be cut and prepared in portions which are as identical as possible. Correspondingly equally sized portions of meat could then be processed further or sold optimally.

Corresponding calibrating devices have also been disclosed, for example, for shaped and processed meat, in which the meat is initially processed and pressed together again in such a manner that it assumes a certain shape. However, for the time being this requires the stringy meat to be processed into very small pieces or involves utilizing meat residues.

A calibrated cutting installation having a shaping tube for feeding the meat to a cutting device in order to separate meat into portions which are as far as possible of equal size by means of a cutter has already been disclosed. The shaping tube can be separated into two parts in the longitudinal direction. The end of the shaping tube, at a so-called delivery hole, is adjoined by a pot-shaped or shell-shaped depressions, the size and volume of which predetermine the corresponding portion. Then, a cutter can be moved through a in a spacer gap between the feed hole of the shaping tube and the abovementioned calibrated shaping cavity, the oblique arrangement of the cutting edges of which cutter causes a pulling cut, with the result that the corresponding amount of meat situated in the calibrated shaping cavity can be separated from the large remaining amount of meat situated in the shaping tube.

Then, the pot-shaped calibrating plate can be moved in order, if appropriate by means of further auxiliary measures, to remove the amount of meat which is situated in the calibrating cavity from the calibrating cavity and, for example, to deliver it to a conveyor belt.

However, the calibrated cutting device just mentioned has a number of drawbacks.

It has emerged that it is not always possible to ensure that the calibrating cavity is filled as uniformly as possible with the known calibrated cutting device. This is despite the fact that the calibrating cavity is designed more in the shape of a soup-dish, i.e. has a concave curve at the transition from the base area to the side wall area, avoiding a sharp edge, so that, as far as possible, inclusions of air are prevented. In addition, vacuum suction lines emerge from the area of the base of the calibrating cavity, in order to use a further suction device to pull in each case the next portion of meat optimally into the calibrating cavity. However, in this case too it has been found that the meat which is to be processed partially closes the suction passages which are present, so that air bubbles which are situated at a different location between the meat portion and the calibrating cavity cannot be sucked out. Ultimately, this leads to the size and weight of the meat portions which are to be separated differing considerably, at least in relative terms.

In view of the above, working on the basis of the abovementioned prior art, the object of the invention is to provide an improved calibrated cutting device which can be used to portion foodstuffs that are suitable for cutting, in particular meat, as optimally as possible, with the minimum possible weight and/or volume discrepancies.

BRIEF DESCRIPTION OF THE DRAWINGS

The invention is explained in more detail below with reference to an exemplary embodiment, in which, in detail.

DESCRIPTION OF THE INVENTION

Figure 1:
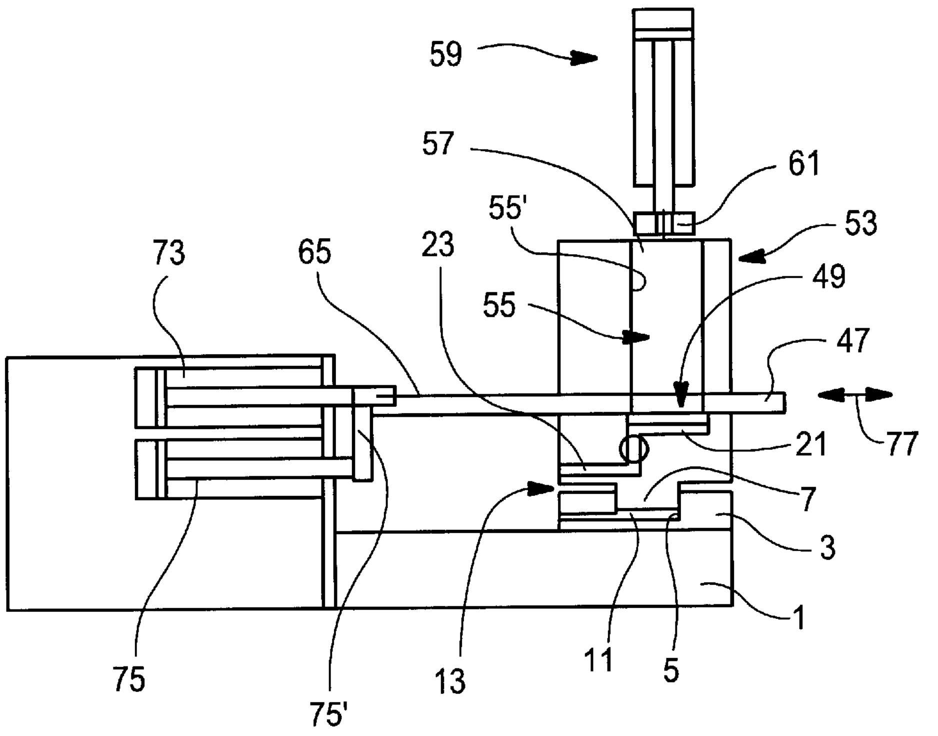
FIG. 1: shows a diagrammatic, longitudinal side view through a vertical, central longitudinal section through the calibrated cutting device.

With the present invention, relatively simple means are used to achieve considerable improvements over the prior art.

Thus, it has emerged that the structure and the functioning of the vacuum for pulling the next meat portion into the calibrating cavity can be decisively improved by the fact that a connection which is as far as possible vacuum-tight can be produced between the delivery hole of the shaping tube and the adjoining feed hole of the calibrating cavity. As a result, the feed movement of the meat situated in the shaping cavity is supported by the sucking action of the vacuum for which reason the importance of a press ram which can additionally be moved in the advancement direction from the rear side in the shaping cavity is lowered and reduced. According to the invention, this is achieved by means of a pressure-exerting or clamping device which, at least during certain working cycles of the calibrated cutting device, at least indirectly presses the calibrated shaping cavity and the delivery hole in the shaping tube together, so that in this area the desired pressure reduction is maintained further and can continue to act in the shaping tube.

In a preferred embodiment of the invention, the cutter used is a perforated cutter, the size of perforations of which at least corresponds to the size and shape of the feed hole of the calibrating cavity. Then, during the cutting stroke, the perforated cutter is moved in the longitudinal direction between the output hole in the shaping plate and the support surface of the calibrating plate which accommodates in the calibrating cavity. Moreover, the use of the perforated cutter further assists with building up the abovementioned vacuum, since the perforated cutter is arranged with an encircling section of material between the output hole of the shaping tube and the feed hole of the calibrating plate which accommodates in the calibrating cavity.

The cutter is preferably of the same shape as the calibrating plate and may in this case be ground from solid tool steel. In the trailing area, that is to say in the cutting direction, it is preferably provided with two blades which are directed at an angle to one another. The thickness of the cutter can be selected to be extremely thin, preferably ranging between 0.5 mm and 3 mm.

However, the pressure between calibrating cavity and shaping cavity, preferably with the inclusion of the perforated cutter situated between them, is not only a prerequisite for a continuous, optimum vacuum to be applied, but also it prevents a smearing effect of the cutter, which represents a drawback. This is because, according to the invention, the clamping action means that an extremely thin cutter can be used, having the further advantage that in the area of the volume which corresponds to the thickness of the cutter material it is virtually impossible for any residual quantities of meat to remain, since the wedge effect of the cutter is only minimal, due to its small thickness.

The calibrated cutting device shown in the figures comprises a base 1, which is also referred to below as a base frame.

A pressure-exerting plate 3 is fitted in the area of one end side of the base frame 1, which is rectangular in plan view, which pressure-exerting plate has a cylindrical bore 5 which faces upward and in which a cylindrical mating piece 7 of a vacuum plate 9 engages.

By means of the cylindrical mating piece 7, which engages in the cylindrical bore 5, of the vacuum plate 9, a pressure chamber 11 of a clamping unit 13 is created, the importance of which will be dealt with below.

By means of a compressed-air port 17 with a following pressure line 19, compressed air can be fed in controlled amounts to the pressure chamber 11 of a compressed-air source (not shown in more detail).

The abovementioned vacuum plate 9 has a reduced-pressure chamber 21 which is in communication with a suction port 25 via a suction line 23. A vacuum valve 27, which is only indicated in FIG. 1, is also fitted in the suction line 23.

An inlay plate 31, which is offset at a higher level with respect to the base of the reduced-pressure chamber 21 by means of feet or spacers 33, is inserted in the reduced-pressure chamber 21. The top side 31' of the inlay plate 31 is approximately flush with the surface 35 of the vacuum plate 9 or is arranged only—preferably only fractions of a millimeter—lower than the surface 35 of the vacuum plate 9.

In plan view, the shape and dimensions of the inlay plate 31 are designed in such a way with respect to the dimensions and shape of the reduced-pressure chamber 21, likewise in plan view, that only an extremely small gap is formed between the periphery edge 39 of the inlay plate 31 and the adjacent, encircling wall surface 43 of the reduced-pressure chamber 21; this gap may, for example, be between 0.05 and 2 mm, preferably between 0.1 and 1 mm, in particular between 0.2 and 0.6 mm. In the exemplary embodiment shown, a gap width of 0.3 mm is selected. In the exemplary embodiment shown, the gap height is 5 mm, corresponding to the thickness of the actual inlay plate 31 situated above the feet 33. These small dimensions of the gap 37 ensure that it is impossible for any relatively large meat particles to be sucked out during the calibration and cutting operation (FIG. 3).

Figure 2:
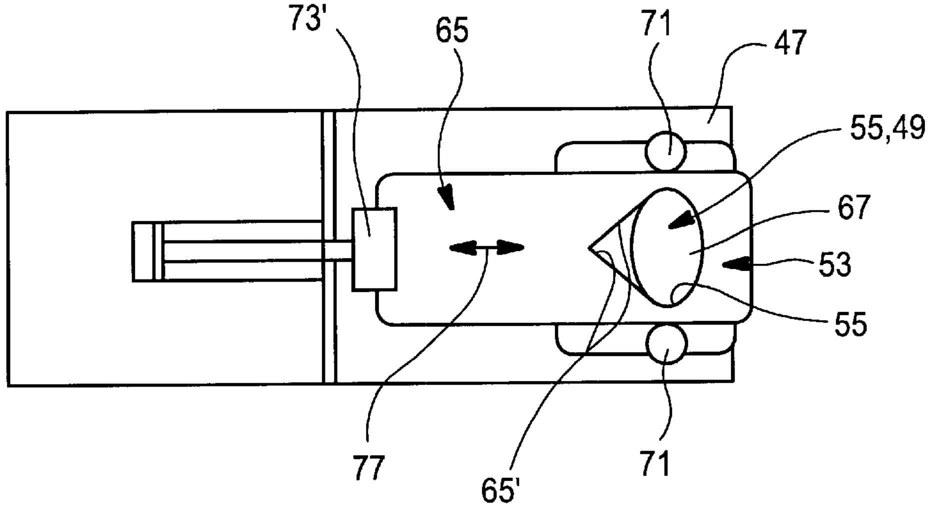
FIG. 2: shows a diagrammatic, horizontal plan view at the level of the cutter, with a shaping tube having been omitted.
Figure 3:
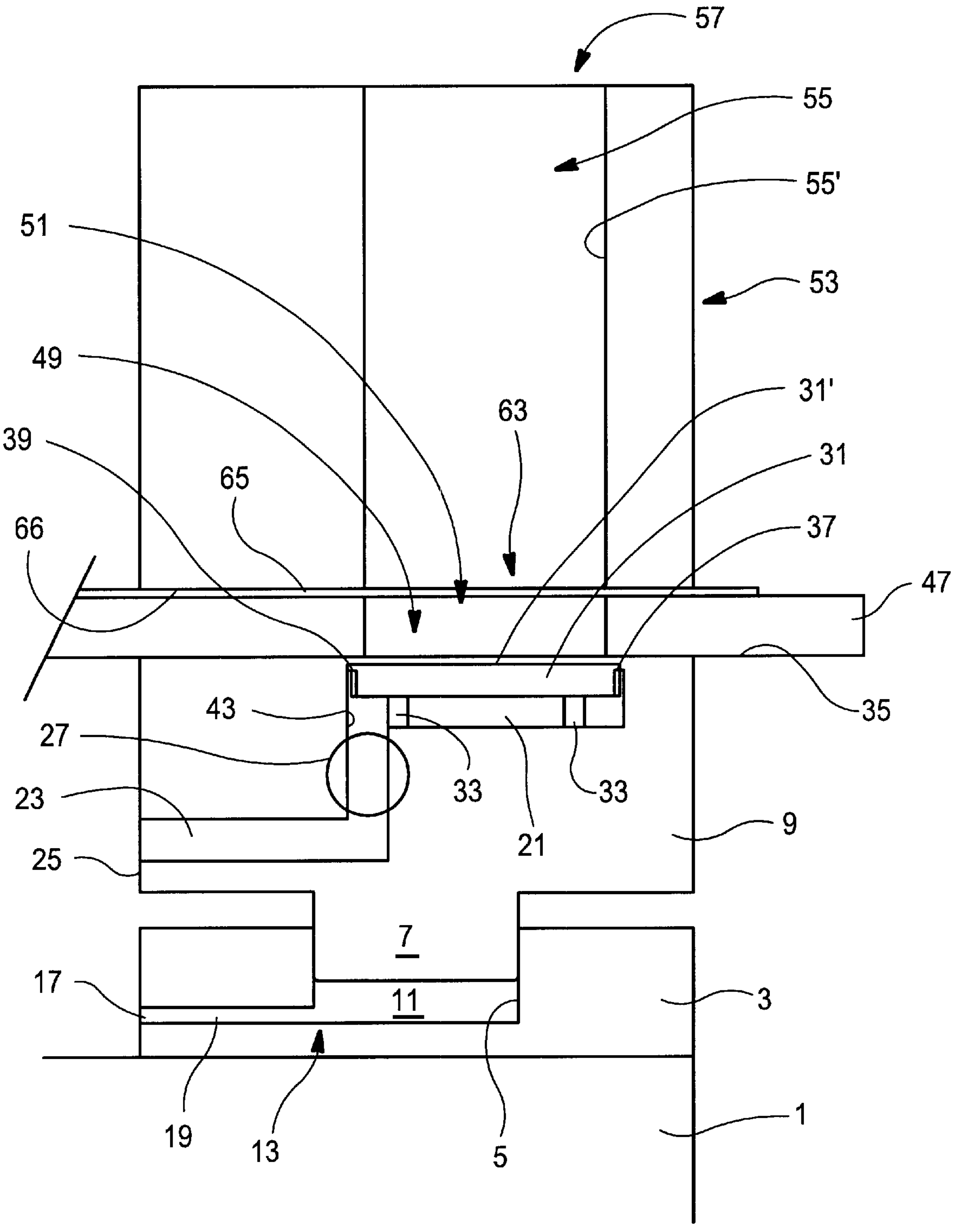
FIG. 3: shows an enlarged detailed view from FIG. 1.

A calibrating plate 47, which is shown in its basic position in FIGS. 1 to 3 and comprises a hollow or calibrated shaping cavity 49 which surrounds by the material of the calibrating plate 47 in plan view and is open at the top and bottom, rests on the surface 35. The feed hole 51, which faces upward, and the horizontal cross-sectional shape and dimensions of this shaping cavity correspond to the horizontal cross-sectional shape and dimensions of a shaping tube body 53 which is arranged above the calibrating plate 47 and has a shaping tube 55, which is situated vertically in the interior and from the top, charging side 57 of which meat to be portioned can be supplied and pushed downward via a press ram 61 which is arranged above the charging hole 57 and can be actuated by means of a press cylinder 59. In plan view, the shaping tube is oval in cross section, namely with an oval hole 55', as can be seen in the plan view shown in FIG. 2. Apart from the cutting edges 65' which are aligned in the shape of a wedge, this oval shape 55' also corresponds to the cross-sectional shape and size of the calibrated shaping cavity 49. The shaping tube 55 or the shaping tube body 53 may be formed form a plurality of plates with corresponding recesses, which can be laid on top of one another, the shaping tube body 53 or the individual plates which form this body being held by two side guide columns 71 which are connected to the base 1 and are held securely above it. Alternatively, the shaping tube body may also be divided in two in its longitudinal axis, for example in the form of two half-shells.

Since the lower surface of the shaping tube body 53 serves as a sealing surface with respect to the cutter 65, the lower bearing or sealing surface 66 of the shaping body 55 has to cover the V-shaped cutout 67 of the cutter 65 in the starting or filling position.

As can be seen from FIG. 1 and in particular from the enlarged, vertical cross-sectional view shown in FIG. 3, the shape and dimensions of the hole in the vacuum or reduced-pressure chamber 21, which accommodates the inlay plate 31, are slightly larger than the horizontal cross-sectional shape and dimensions of the hollow or calibrated shaping cavity 49 in the calibrating plate 47 and/or the horizontal cross-sectional shape or dimensions of the shaping tube 55.

Finally, a cutter 65, i.e. a perforated cutter 65, is provided between the calibrating plate 47, resting on the latter, and the underside of the shaping tube body 53, which cutter is of approximately rectangular design in plan view, i.e. is in the shape of a plate, and comprises a cutting hole 67 (FIG. 2), which at least corresponds to the size and shape of the delivery hole 63 of the shaping tube 55 and/or the feed hole 51 of the calibrated shaping cavity 49. In the exemplary embodiment shown, the cutting edges, in plan view, are of V-shaped design in the leading cutting direction (FIG. 2), the two cutting edges 65', which are in a V shape with respect to one another, coming together in the central longitudinal axis of the rectangular perforated cutter 65. The two cutting edges 65' run, for example, at a 45° angle to the central longitudinal plane of the cutter, i.e. they include an angle of approximately 90° with one another, i.e. include an angle of approximately 90° with respect to one another and, in this way, produce a pulling cut. The inclination of the cutter may also vary to a correspondingly great extent, for example by at least up to +/−30° and more. Alternatively, it is also possible to provide exchangeable blades 65' in a cutter body.

However, as an alternative to a cutting arrangement which can be moved to and fro, in principle a rotating cutting device is also conceivable. For example, it would be possible to use a disk-like cutting device which comprise closed cutting holes which are offset with respect to one another in sectors and the size and function of which correspond to the cutting hole described above; to carry out a cutting operation, a movement of the cutter along a circle or part of a circle with an axis of rotation which is outside the cutter hole would have to be executed. In this case, a continuous rotary movement of the cutting device, at least in steps, would be possible if all the cutting holes in the rotating perforated cutter have trailing cutting edges.

On that side of the base frame 1 which is opposite from the shaping tube body 53, there may, in addition to control elements and devices, additionally be at least two cylinders 73 and 75, namely a cutter cylinder 73 for moving the perforated cutter 65 forward and backward as illustrated by the arrow 77 and a calibrating cylinder 75 corresponding to the adjustment movements of the calibrating plate 47, likewise in the direction of arrow 77. For this purpose, the two calibrating cylinders 75, 77 are fixedly connected to the cutter 65 and the calibrating plate 47 by means of clamping/holding elements 75'.

The cutter is preferably of the same shape as the calibrating plate and consists of and is ground from a solid tool steel. The thickness of the cutter may vary within suitable ranges, for example from 0.3 mm to 5 mm, preferably may vary from 0.5 mm to 1.0 mm. Like the calibrating plate (which will be dealt with in more detail below), the cutter also moves at a right angle to the vertically oriented shaping tube 55.

The method of operation is dealt with below.

Since, as is customary, cleaning has been carried out according to the extent to which the overall device can be broken down, the device can then be reassembled and put into operation. A suction hose is connected to the suction port 25, and a compressed-air hose is connected to the compressed-air port 17, which hoses are connected to corresponding vacuum and compressed-air devices.

Furthermore, three further hose ports are provided. One hose port is required in order to restore the plunger of the vacuum valve, since when the cutter reaches its extended limit position following the cutting operation (or shortly before), a valve plunger of the valve arrangement 27 is turned and the vacuum supply to the reduced-pressure chamber is interrupted. Then, the calibrating plate is extended forward. The cylinder outlet air is additionally utilized in order to ventilate the vacuum chamber. In this way, the pressure reduction which is present in the vacuum chamber is eliminated more quickly. The elimination of the pressure reduction prevents a sucking action from the vacuum chamber still being present when the calibrating plate is pushed out. The further hose port mentioned above serves as an air port for the vacuum chamber in order for compressed air to be pumped in here. The final hose port serves as the pressure connection to the vacuum chamber, in order to accommodate a vacuum switch in this hose port so as to measure the pressure in the vacuum chamber.

To portion relatively large amounts of meat, a suitable piece of meat is passed through the charging hole 57 from above into the shaping tube 55, the pressure reduction which has been generated by a vacuum device (not shown in more detail) and is active in the reduced-pressure chamber 21 pulling the piece of meat further into the shaping tube 55. The advancement movement of the piece of meat is assisted by subsequent actuation of the press cylinder 59.

As a result of the pressure reduction generated in the reduced-pressure chamber 21 and the advancement movement of the press ram 61, the leading area of the piece of meat which is to be portioned is moved downward until the front part of the piece of meat which is to be portioned completely fills the hollow or calibrated shaping cavity 49. However, due to the extremely small gaps 37, it is impossible for any meat to penetrate into or be sucked out through the vacuum and suction gaps 37.

The desired pressure reduction for assisting with the advancement movement of the meat to be portioned and the complete filling of the calibrated shaping cavity 49 by the meat is primarily assisted and ensured by the fact that the entire arrangement of shaping tube body 53, perforated cutter 65 and the calibrating plate 47 situated beneath it is subjected to preliminary pressure and clamped together by the clamping device 13 with the pressure-exerting and vacuum plate (explained at the beginning) in the manner of an assembly so that as far as possible there can be no ambient pressure penetrating into the reduced-pressure area, causing a loss of the pressure reduction. Since, moreover, a perforated cutter is used, it is also impossible for any atmospheric pressure to pass into the reduced-pressure area in the region of the cutter. Moreover, due to the abovementioned guide columns 71, the shaping tube body 53 is held securely and non-displaceably with respect to the base 1, as a pressure-exerting abutment, in order that the clamping unit 13 formed in this way can be optimally pressed together accordingly.

As soon as a piece of meat to be portioned has filled the entire calibrated shaping cavity 49, a vacuum switch 27 which is in communication with the reduced-pressure chamber 21 can be used to establish a change in the pressure reduction. Furthermore, the cutter cylinder 73 can then be triggered and actuated, this cylinder being extended in the cutting direction and, in the process, separating the amount of meat which is situated in the calibrated shaping cavity 49 from the amount of meat which is situated in the shaping tube body 53. In the device described, the clamping device 13 is permanently exposed to pressure and clamped in place, providing the further advantage that it is possible to use an extremely thin cutting plate or cutting disk. The clamping device which is under pressure protects the thin metal sheet of the cutter from becoming deformed, and the cutter is also stabilized by the opposite wall sections of the underside 66 of the shaping tube body 53 or the top side of the calibrating plate 47.

As soon as the cutter has reached its front limit position, i.e. at least when the cutting hole 67 has fully traversed the feed hole 51 in the calibrated shaping cavity 49, the calibrating cylinder 75 and therefore the calibrating plate 47 are likewise made to advance. As soon as the calibrated shaping cavity 49 has moved beyond the vacuum plate, the meat can be passed, for example downward, to a delivery station, for example an outgoing conveyor belt, etc., either by its own weight or by means of an additional ejector device. A simple auxiliary device which ejects the portioned meat may, for example, comprise levers which press the meat downward out of the calibrating mold. The ejector device may also be a short, sufficiently strong air stream which can be generated, for example, by cylinder outlet air. Other ejector devices are also possible.

Then, for preference, firstly the calibrating plate and then the perforated cutter move back into their starting position shown in FIGS. 1 to 3 and the operation repeats itself, i.e. after the starting portion of the cutter 65 and the calibrating plate 47 has been reached, firstly the clamping device 13 is confirmed once again and a pressure reduction is built up in the vacuum chamber 21, and through actuation of the press ram 61 the meat which is situated in the shaping tube is moved further in the direction of advancement, i.e. into the calibrated shaping cavity again, etc. As soon as the entire amount of meat has been portioned and the press ram 49 which has moved forward in the shaping tube 55 has reached its lowermost position (which is no lower than the level of the bottom surface of the underside of the mating pressure plate 66 of the shaping tube body 53), a complete cutting operation is then carried out once again, so that the press ram can then be retracted from the shaping tube.

If different types of meat are to be processed or types of meat are to be portioned with different sizes and weights, it is possible to use differently dimensioned cutting and calibrating plates with differently dimensioned and shaped calibrated shaping cavities. With the same perforated cutter and the same shaping tube, the calibrating plates then differ through a different thickness, in order to vary the weight and size of the amount of meat to be portioned. However, if the size of the amount of meat to be portioned is to be varied in side view, it would then also be necessary to fit a different perforated cutter with correspondingly different sizes of cutting holes and a shaping tube of different cross section.

The calibrated cutting device which has been explained can be used to produce meat portions of equal size which differ, for example, by only extremely small amounts of +/−5 grams and less, for example of +/−2 grams.

The entire control arrangement may be of different structure. For example, an electrical control unit, for example in the form of a PLC, a contactor control unit or a relay control unit or in the form of combinations may be suitable. A microprocessor-assisted control unit is also possible, in particular if the calibrated cutting-device is incorporated into a larger installation. In the actual embodiment shown, compressed-air control has been described. Without being described in detail, it is possible for magnetic switches to be provided on the cylinders, working valves and control valves, and the valves used may be OR, AND, 3/2-way or, for example, 5/2 valves. Pressure reducers, manometers and vacuum switches are also components which can be used for operation.

For example, in particular the vacuum valve 27 described may also be actuated by plunger actuation from the displaceable cutter holder and the restoring air.

A very wide range of variants are possible for the vacuum-generating means explained in connection with the operation of the device. By way of example, it is possible for a vacuum-generating means to be based on the Venturi principle in order to generate a pressure reduction. In this case, the vacuum-generating means can be switched on by the pneumatic control unit only for the phases when the calibrating cavity is to be refilled with meat. However, it may also be necessary for this unit to be activated at all times, so that a "vacuum cushion" builds up in the filters, until the plunger valve 27 opens again. Naturally, it is also possible to use a continuously running vacuum pump. Reduced pressure is only passed into the vacuum or reduced-pressure plate by the valve plunger 27 which has been explained when this reduced pressure is required. In the interim periods, a vacuum cushion can build up in the filters.

With the calibrated cutting device it is possible, for example, to realize a cutting cycle time of 1 second, meaning that one slice of meat can be portioned and ejected every second.

What is claimed is:

1. Calibrated cutting device for portioning foodstuff products that are suitable for cutting, in particular meat products, comprising the following features a base frame (1) is provided, a shaping tube (55) is provided for moving the foodstuff product to be portioned forward into a calibrated shaping cavity (49), the calibrated shaping cavity (49) is a module separated from the shaping tube (55), between the calibrated shaping cavity (49) and the shaping tube (55) there is a cutting arrangement (65) which can be moved longitudinally between the feed hole (31) of the calibrated shaping cavity (49) and the adjacent delivery hole (63) of the shaping tube (55), characterized by the following further features a clamping device (13) is provided, and the shaping tube (55) and the calibrated shaping cavity (49) can be pressed against one another by the clamping device (13) in order to achieve a pressure reduction which acts via the calibrated shaping cavity (49) into the shaping tube (55).

2. Calibrated cutting device according to claim 1, characterized in that the cutter (45) is designed as a perforated cutter in the shape of a cutting plate with a cutting hole (67), and in the starting position of the cutter (45), in plan view, the cutting hole (67) is in an overlapping arrangement with the delivery hole (63) on the underside of the shaping tube (55) and with the feed hole (51) of the calibrated shaping cavity (49).

3. Calibrated cutting device according to claim 1, characterized in that the calibrated shaping cavity (49) is formed in a calibrating plate (47), specifically as a calibrated shaping cavity (49) which passes through the calibrating plate (47) and is open at the top and bottom.

4. Calibrated cutting device according to claim 1, characterized in that the perforated cutter (65) is designed in the shape of a plate and bears on and is supported above the calibrating plate (47).

5. Calibrated cutting device according to claim 1, characterized in that the shaping tube (55) is arranged in a shaping tube body (53) with a support surface (66) facing downward, the perforated cutter (65) being covered and held in the manner of a sandwich between the support surface (66) of the shaping tube body (53) and the calibrating plate (47).

6. Calibrated cutting device according to claim 1, characterized in that a clamping cylinder arrangement of the clamping device (13) is provided beneath the calibrating plate (47), over which the arrangement of shaping tube (55), perforated cutter (65) and calibrating plate (47) can be clamped, preferably with a vacuum plate (9) via a pressure-exerting plate (3) situated beneath it.

7. Calibrated cutting device according to claim 1, characterized in that a reduced-pressure chamber (21) is provided beneath the calibrated shaping cavity (49) in a vacuum plate (9), in which an inlay plate (31), which serves as a support for the foodstuff to be portioned, is arranged.

8. Calibrated cutting device according to claim 7, characterized in that the shape and dimensions of the inlay plate (31) are slightly larger than the shape and dimensions of the feed hole (51) of the calibrated shaping cavity (49) and/or the delivery hole (63) of the shaping tube (55).

9. Calibrated cutting device according to claim 7, characterized in that a gap (37), which preferably runs all the way around, is formed as a reduced-pressure passage between the periphery edge of the inlay plate (31) and the adjoining wall section (43) of the reduced-pressure chamber (21).

10. Calibrated cutting device according to claim 9, characterized in that the gap (37) is smaller than 2 mm, in particular smaller than 1 mm, in particular smaller than 0.5 mm.

11. Calibrated cutting device according to claim 1, characterized in that the cutting hole (67) is of a basic shape and size which correspond to the cross-sectional shape and size of the shaping tube (55) and/or the feed hole (51) of the calibrated shaping cavity (49).

12. Calibrated cutting device according to claim 11 characterized in that two cutting edges (65'), which run at an angle to one another, are provided on the leading side of the cutting hole (67).

13. Calibrated cutting device according to claim 12, characterized in that the two cutting edges include an angle of from +60° to 120°, preferably around 90°, with one another.

14. Calibrated cutting device according to claim 12, characterized in that the two cutting edges (65') are arranged symmetrically with respect to a vertical central longitudinal plane.

15. Calibrated cutting device according to claim 12, characterized in that the cutter comprises a steel plate, the thickness of which preferably varies between 0.2 mm and 6 mm, in particular between 0.4 mm and 5 mm, preferably between 0.5 mm and 3 mm.

16. Calibrated cutting device according to claim 1, characterized in that the calibrating plate (47) and the cutter (65) are arranged perpendicular to the vertical extent of the shaping tube (55).

* * * * *